(12) United States Patent
Miyagoe et al.

(10) Patent No.: US 8,188,697 B2
(45) Date of Patent: May 29, 2012

(54) APPARATUS AND METHOD FOR DRIVING A MOTOR

(75) Inventors: Yasuhiro Miyagoe, Kyoto (JP); Yoshito Otaguro, Kyoto (JP)

(73) Assignee: Rohm Co., Ltd. (JP)

( * ) Notice: Subject to any disclaimer, the term of this patent is extended or adjusted under 35 U.S.C. 154(b) by 435 days.

(21) Appl. No.: 12/470,951

(22) Filed: May 22, 2009

(65) Prior Publication Data
US 2009/0289588 A1 Nov. 26, 2009

(30) Foreign Application Priority Data

May 22, 2008 (JP) .................................. 2008-134496
Apr. 15, 2009 (JP) .................................. 2009-099244

(51) Int. Cl.
*H02P 6/00* (2006.01)
(52) U.S. Cl. .................... 318/400.35; 318/560; 318/561; 369/215.1
(58) Field of Classification Search ............. 318/400.04, 318/400.05, 400.06, 400.35, 560, 561, 599; 369/215.1
See application file for complete search history.

(56) References Cited

U.S. PATENT DOCUMENTS

| | | | | |
|---|---|---|---|---|
| 7,609,013 | B2* | 10/2009 | Sugie | 318/400.06 |
| 7,855,521 | B2* | 12/2010 | Otaguro | 318/4 |
| 2008/0252238 | A1* | 10/2008 | Otaguro | 318/400.05 |
| 2008/0252240 | A1* | 10/2008 | Sugie | 318/400.06 |
| 2010/0177626 | A1* | 7/2010 | Otaguro | 369/215.1 |

FOREIGN PATENT DOCUMENTS

| | | |
|---|---|---|
| JP | 3-207250 A | 9/1991 |
| JP | 8-331887 A | 12/1996 |
| JP | 10-243685 A | 9/1998 |
| JP | 11-75388 A | 3/1999 |

* cited by examiner

*Primary Examiner* — Paul Ip
(74) *Attorney, Agent, or Firm* — Cantor Colburn LLP

(57) ABSTRACT

A sampling circuit samples, while running a motor at a predetermined rotational speed, over a predetermined period a back electro-motive force induced at one end of at least one phase coil, with one end of each phase coil of the motor being brought to a high impedance. A waveform data generating circuit holds as waveform data SIN the back electro-motive force beforehand sampled by the sampling circuit. A PWM signal generating circuit sequentially reads the waveform data SIN from the waveform data generating circuit to generate a PWM signal Spwm, the pulse width of which is modulated.

25 Claims, 12 Drawing Sheets

FIG.7A SIN_U 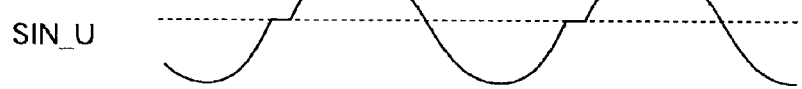
FIG.7B SIN_V 
FIG.7C SIN_W 
FIG.7D BEMF_EDGE 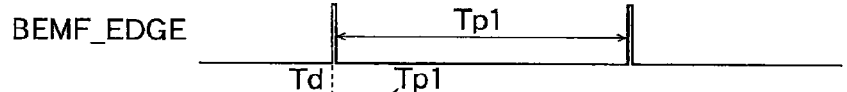
FIG.7E DRV 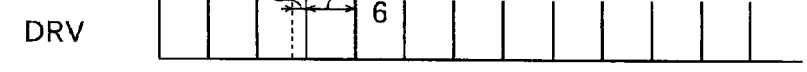
FIG.7F WINDOW 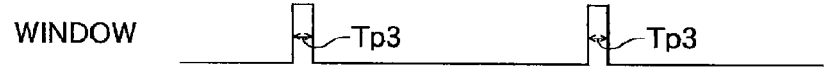
FIG.7G DRV_HU 
FIG.7H DRV_HV 
FIG.7I DRV_HW 
FIG.7J DRV_LU 
FIG.7K DRV_LV 
FIG.7L DRV_LW 

FIG. 8A  BEMF_EDGE 
FIG. 8B  PULSE 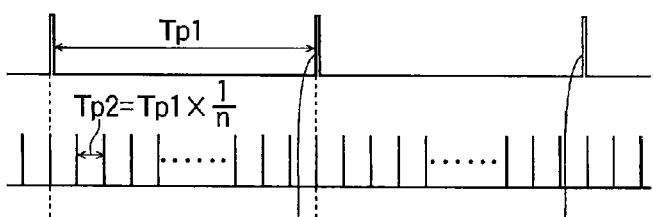
FIG. 8C  OPEN_EDGE 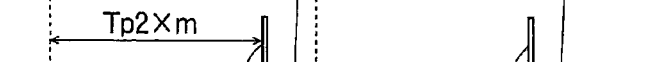
FIG. 8D  WINDOW 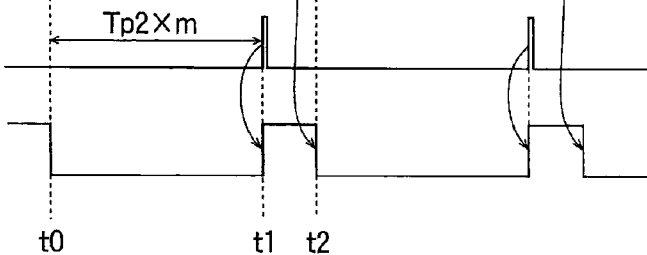

APPARATUS AND METHOD FOR DRIVING A MOTOR

BACKGROUND OF THE INVENTION

1. Field of the Invention

The present invention relates to a technique for driving a multiphase direct current (DC) motor.

2. Description of the Related Art

In portable Compact Disk (CD) apparatuses and electronic apparatuses using disk-type media such as Digital Versatile Discs (DVDs), brushless DC motors (spindle motors) are used for rotating the disks. The brushless DC motor generally comprises: a rotor provided with a permanent magnet; and a stator provided with a plurality of coils connected together in star connection. In the motor, the coils are energized by controlling a current supplied thereto such that the rotor is relatively rotated with respect to the stator. The brushless DC motor is generally provided with a sensor such as a Hall element and an optical encoder to detest a rotational position of the rotor. In accordance with the position detected by the sensor, a current supplied to each phase coil is switched such that the rotor is offered with an adequate torque.

In order to suppress a noise emanating from a motor, there has been presented a technique in which a conduction period of each phase coil (U-phase, V-phase, W-phase) of the motor is subjected to switching by using a pulse width modulated signal, the pulse width of which varies in a sine wave pattern, so that a current flowing through the coil of the motor (also referred to as a coil current) is slowly varied in a sine wave pattern. Alternatively, a trapezoidal waveform is sometimes used instead of a sine wave.

[Patent Document 1] Japanese Patent Application Laid-open No. Hei 3-207250

[Patent Document 2] Japanese Patent Application Laid-open No. Hei 10-243685

[Patent Document 3] Japanese Patent Application Laid-open No. Hei 11-75388

[Patent Document 4] Japanese Patent Application Laid-open No. Hei 8-331887

The present inventor has studied a motor drive circuit that varies the coil current of a motor in a sine wave pattern. As a result, the inventor has recognized the following challenge.

The inventor's recognition is that, even if a pulse width of a pulse width modulated signal is varied according to an ideal sine wave, the coil current does not necessarily have the ideal sine wave. This is because coil inductance of the motor has a variation dependent on its type and individual variation. In other words, it can be said that conventional motor drive techniques admit of further enhanced silence realized by bringing the waveform of the coil current closer to a sine wave.

In addition, inexpensive motors particularly have such large variations that the motors are difficult to be used as a spindle motor in a hard disk apparatus in which silence is needed, leading to the situation where expensive motors have to be used. If silence can be enhanced by improving the motor drive circuit, inexpensive motors can be used in wider areas.

SUMMARY OF THE INVENTION

The present invention has been made in view of these situations, and a general purpose of the invention is to provide a motor drive technique in which a coil current can be brought close to an ideal sine wave.

1. An embodiment of the present invention relates to a method for subjecting a multiphase DC motor to switch driving by using a pulse modulated signal. The method comprises: rotating the multiphase DC motor at a predetermined rotational speed; sampling over a predetermined period a back electro-motive force induced at one end of at least one phase coil of the multiphase DC motor, with one end of each phase coil being brought to a high impedance, so that waveform data is generated accordingly; generating a pulse modulated signal, the pulse width of which varies in accordance with the waveform data; and subjecting the multiphase DC motor to the switch driving by using the pulse modulated signal.

According to the embodiment, the coil current of the multiphase DC motor can be brought close to the ideal sine wave by measuring the back electro-motive force induced in the coil while the motor is running idle and by subjecting the motor to pulse modulated drive based on the measured waveform data, eventually allowing silence of the motor to be enhanced.

In the sampling, one end of each of the all phase coils may be set in a high impedance state. Accurate waveform data can be obtained by turning off all transistors in bridge circuits connected to the all phase coils, without limiting to the coil of the phase, the back electro-motive force induced in which is to be measured.

In the sampling, the waveform data may be generated by sampling the back electro-motive force induced in a single phase coil. In the generating, a pulse modulated signal for driving the coils of all phases may be generated by using the waveform data generated with respect to the coil of a phase. In this case, a memory capacity for storing the waveform data can be reduced.

It may be possible that, in the sampling, each of the back electro-motive forces induced in the all phase coils is sampled, and in the generating, a pulse modulated signal for driving the coil of a phase is generated by using the waveform data generated for each phase. Characteristic variations in each phase coil can be preferably cancelled out with each other by sampling the waveform data for each phase, allowing the coil current to be brought close to the ideal sine wave.

In the subjecting, the multiphase DC motor may be driven by a 120 degrees excitation method. It may be possible that, in the sampling, the back electro-motive force is sampled over a predetermined electrical angle less than 240°, and in the generating, the pulse modulated signal over the electrical angle of 240° is generated by using the waveform data sampled over the predetermined electrical angle. The ideal waveform data is regular data having periodicity, obtained by addition or subtraction of trigonometric functions. If the waveform data is generated over a range of an electrical angle, the waveform data at another electrical angle can be estimated. In this case, a memory capacity for storing the waveform data can be reduced.

The predetermined electrical angle may be 90°. In the generating, it may be possible that: (1) the pulse modulated signal, the electrical angle of which ranges 0° to 90°, is generated by using the sampled waveform data, the electrical angle of which ranges 0° to 90°; (2) the pulse modulated signal, the electrical angle of which ranges 90° to 120°, is generated by inverting the sampled waveform data, the electrical angle of which ranges 60° to 90°, with respect to the time axis; (3) the pulse modulated signal, the electrical angle of which ranges 120° to 150°, is generated by using the sampled waveform data, the electrical angle of which ranges 60° to 90°; and (4) the pulse modulated signal, the electrical angle of which ranges 150° to 240°, is generated by inverting the sampled waveform data, the electrical angle of which ranges 0° to 90°, with respect to the time axis.

The predetermined electrical angle may be 120°. In the generating, it may be possible that: (1) the pulse modulated signal, the electrical angle of which ranges 0° to 120°, is generated by using the sampled waveform data, the electrical angle of which ranges 0° to 120°; and (2) the pulse modulated signal, the electrical angle of which ranges 120° to 240°, is generated by inverting the sampled waveform data, the electrical angle of which ranges 0° to 120°, with respect to the time axis.

It may be possible that, in the subjecting, the multiphase DC motor is driven by the 120 degrees excitation method, and in the sampling, the back electro-motive force is sampled over an electrical angle of 240°. The coil current can be brought closer to the ideal sine wave by sampling the force over 240°.

The multiphase DC motor may be a spindle motor in a hard disk apparatus. The spindle motor in a hard disk apparatus needs to be highly silent, and therefore to which the aforementioned method is preferably applied.

The predetermined rotational speed may be equal to the rotational speed of a disk in practical use of the hard disk apparatus. By running idle the motor at the rotational speed in the practical use, the waveform data more preferable for realizing a sine wave coil current can be obtained.

Another embodiment of the present invention relates to a method for generating waveform data, which is the base of a pulse modulated signal used in subjecting a multiphase DC motor to pulse modulated drive. The method comprises: rotating the multiphase DC motor at a predetermined rotational speed; sampling over a predetermined period a back electro-motive force induced at one end of at least one phase coil of the multiphase DC motor, with one end of each phase coil being set to a high impedance state; and recording the sampled back electro-motive force as waveform data.

In the sampling, one end of each of the all phase coils may be set in a high impedance state.

In the sampling, the back electro-motive force induced in the single phase coil may be sampled on the premise that the force is used for driving the all phase coils.

In the sampling, the back electro-motive forces induced in each of the all phase coils may be sampled.

The multiphase DC motor may be driven by the 120 degrees excitation method. It may be possible that, in the sampling, the back electro-motive force is sampled over a predetermined electrical angle less than 240°, and the waveform data sampled over the predetermined electrical angle is recorded for generating a pulse modulated signal, the electrical angle of which ranges 0° to 240°.

In the sampling, the predetermined electrical angle may be set to 90° on the premise of the following processes (1) to (4): (1) the pulse modulated signal, the electrical angle of which ranges 0° to 90°, is generated by using the sampled waveform data, the electrical angle of which ranges 0° to 90°; (2) the pulse modulated signal, the electrical angle of which ranges 90° to 120°, is generated by inverting the sampled waveform data, the electrical angle of which ranges 60° to 90°, with respect to the time axis; (3) the pulse modulated signal, the electrical angle of which ranges 120° to 150°, is generated by using the sampled waveform data, the electrical angle of which ranges 60° to 90°; and (4) the pulse modulated signal, the electrical angle of which ranges 150° to 240°, is generated by inverting the sampled waveform data, the electrical angle of which ranges 0° to 90°, with respect to the time axis.

In the sampling, the predetermined electrical angle may be set to 120° on the premise of the following processes (5) and (6): (5) the pulse modulated signal, the electrical angle of which ranges 0° to 120°, is generated by using the sampled waveform data, the electrical angle of which ranges 0° to 120°; and (6) the pulse modulated signal, the electrical angle of which ranges 120° to 240°, is generated by inverting the sampled waveform data, the electrical angle of which ranges 0° to 120°, with respect to the time axis.

The multiphase DC motor may be driven by the 120 degrees excitation method. In the sampling, the back electro-motive force may be sampled over an electrical angle of 240°.

The multiphase DC motor may be a spindle motor in a hard disk apparatus.

The predetermined rotational speed may be equal to the rotational speed of a disk in practical use of the hard disk apparatus.

Yet another embodiment of the present invention relates to a drive circuit of a multiphase DC motor. The motor drive circuit comprises: a plurality of switching circuits, each of which is provided for each coil of the multiphase DC motor so as to apply a high-level or low-level voltage to one end of a corresponding coil; a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level; a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater; a waveform data generating circuit that receives the pulse signal from the pulse signal generating circuit and that outputs predetermined waveform data in accordance with the pulse signal; a pulse modulated signal generating circuit that generates a pulse modulated signal by using the waveform data from the waveform data generating circuit; a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal; and a sampling circuit that, while running the multiphase DC motor at a predetermined rotational speed, samples over a predetermined period a back electro-motive force induced at one end of at least one phase coil, with one end of each phase coil of the multiphase DC motor being set in a high impedance state. The waveform data generating circuit records as waveform data the back electro-motive force beforehand sampled by the sampling circuit.

By providing in the motor drive circuit the sampling circuit that monitors the back electro-motive force while the motor is running idle, the individual motor drive circuit can generate the waveform data optimal for the motor to be driven.

When the sampling circuit samples the back electro-motive force, the high-side switches and the low-side switches of all of the plurality of switching circuits may be turned off.

It may be possible that the sampling circuit samples the back electro-motive force induced in a single phase coil, and the pulse modulated signal generating circuit generates the pulse modulated signal for driving the coils of all phases by using the waveform data sampled with respect to the single phase coil.

It may be possible that the sampling circuit samples each of the back electro-motive forces induced in the all phase coils to generate the waveform data for each phase, and the pulse modulated signal generating circuit generates the pulse modulated signal for driving the coil of the phase by using the waveform data for each phase.

The present motor drive circuit may be driven by the 120 degrees excitation method. It may be possible that the sampling circuit samples the back electro-motive force over a predetermined electrical angle less than 240°, and the pulse modulated signal generating circuit generates the pulse modulated signal over an electrical angle of 240° by using the waveform data sampled over the predetermined electrical angle.

The predetermined electrical angle may be 90°. In this case, the pulse modulated signal generating circuit may: (1) generate the pulse modulated signal, the electrical angle of which ranges 0° to 90°, by using the sampled waveform data, the electrical angle of which ranges 0° to 90°; (2) generate the pulse modulated signal, the electrical angle of which ranges 90° to 120°, by inverting the sampled waveform data, the electrical angle of which ranges 60° to 90°, with respect to the time axis; (3) generate the pulse modulated signal, the electrical angle of which ranges 120° to 150°, by using the sampled waveform data, the electrical angle of which ranges 60° to 90°; and (4) generate the pulse modulated signal, the electrical angle of which ranges 150° to 240°, by inverting the sampled waveform data, the electrical angle of which ranges 0° to 90°, with respect to the time axis.

The predetermined electrical angle may be 120°. In this case, the pulse modulated signal generating circuit may: (1) generate the pulse modulated signal, the electrical angle of which ranges 0° to 120°, by using the sampled waveform data, the electrical angle of which ranges 0° to 120°; and (2) generate the pulse modulated signal, the electrical angle of which ranges 120° to 240°, by inverting the sampled waveform data, the electrical angle of which ranges 0° to 120°, with respect to the time axis.

The present motor drive circuit may drive the multiphase DC motor by the 120 degrees excitation method. The sampling circuit may sample the back electro-motive force over an electrical angle of 240°.

The multiphase DC motor may be a spindle motor in a hard disk apparatus.

The predetermined rotational speed may be equal to the rotational speed of a disk in practical use of the hard disk apparatus.

Yet another embodiment of the present invention relates to a drive circuit of a multiphase DC motor. The drive circuit comprises: a plurality of switching circuits, each of which is provided for each coil of the multiphase DC motor so as to apply a high-level or low-level voltage to one end of a corresponding coil; a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level; a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater; a waveform data generating circuit that receives the pulse signal from the pulse signal generating circuit and that outputs predetermined waveform data in accordance with the pulse signal; a pulse modulated signal generating circuit that generates a pulse modulated signal by using the waveform data from the waveform data generating circuit; and a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal. The waveform data generating circuit includes a memory. In the memory, the waveform data obtained by sampling over a predetermined period a back electro-motive force induced at one end of at least one phase coil of the multiphase DC motor is held, while rotating the motor at a predetermined rotational speed and setting one end of each phase coil of the motor in a high impedance.

Yet another embodiment of the present invention relates to a hard disk apparatus. The apparatus comprises: a spindle motor that rotates a magnetic disk; and a motor drive circuit according to any one of the aforementioned embodiments, which drives the spindle motor. According to the hard disk apparatus, enhanced silence can be realized.

2. Yet another embodiment of the present invention relates to a method for subjecting a multiphase DC motor to the switch driving by using a pulse modulated signal. The method comprises: rotating the multiphase DC motor at a predetermined rotational speed; reading waveform data stored in a memory such that a pulse modulated signal, the pulse width of which varies in accordance with the waveform data, is generated accordingly; subjecting the multiphase DC motor to the switch driving by using the pulse modulated signal; measuring a physical quantity indicating a rotational state of the multiphase DC motor; and updating the waveform data stored in the memory such that the measured physical quantity is brought close to a target value. According to the embodiment, the waveform data can be optimized for each multiphase DC motor.

The physical quantity may be the vibration or the noise caused due to the rotation of the multiphase DC motor. In this case, the rotation of the motor can be set to one such that the vibration or the noise is reduced. Alternatively, the physical quantity may be power consumption (current consumption) or temperature of the motor.

Yet another embodiment of the present invention relates to a drive circuit of a multiphase DC motor. The drive circuit comprises: a plurality of switching circuits, each of which is provided for each coil of the multiphase DC motor so as to apply a high-level or low-level voltage to one end of a corresponding coil; aback electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level; a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater; a waveform data generating circuit that includes a waveform data memory for storing waveform data and that outputs the waveform data in accordance with the pulse signal from the pulse signal generating circuit; a pulse modulated signal generating circuit that generates a pulse modulated signal by using the waveform data from the waveform data generating circuit; a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal; a sensor by which a physical quantity indicating a rotational state of the multiphase DC motor is measured; and an encoder that updates the waveform data stored in the memory such that the physical quantity measured by the sensor is brought close to a target value.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A to 7L are time charts illustrating operations of the motor drive circuit according to the embodiment;

FIGS. 8A to 8D are time charts illustrating processes of generating the window signal WINDOW;

The invention will now be described based on preferred embodiments which do not intend to limit the scope of the present invention but exemplify the invention. All of the features and the combinations thereof described in the embodiment are not necessarily essential to the invention.

(First Embodiment)

Figure 1:
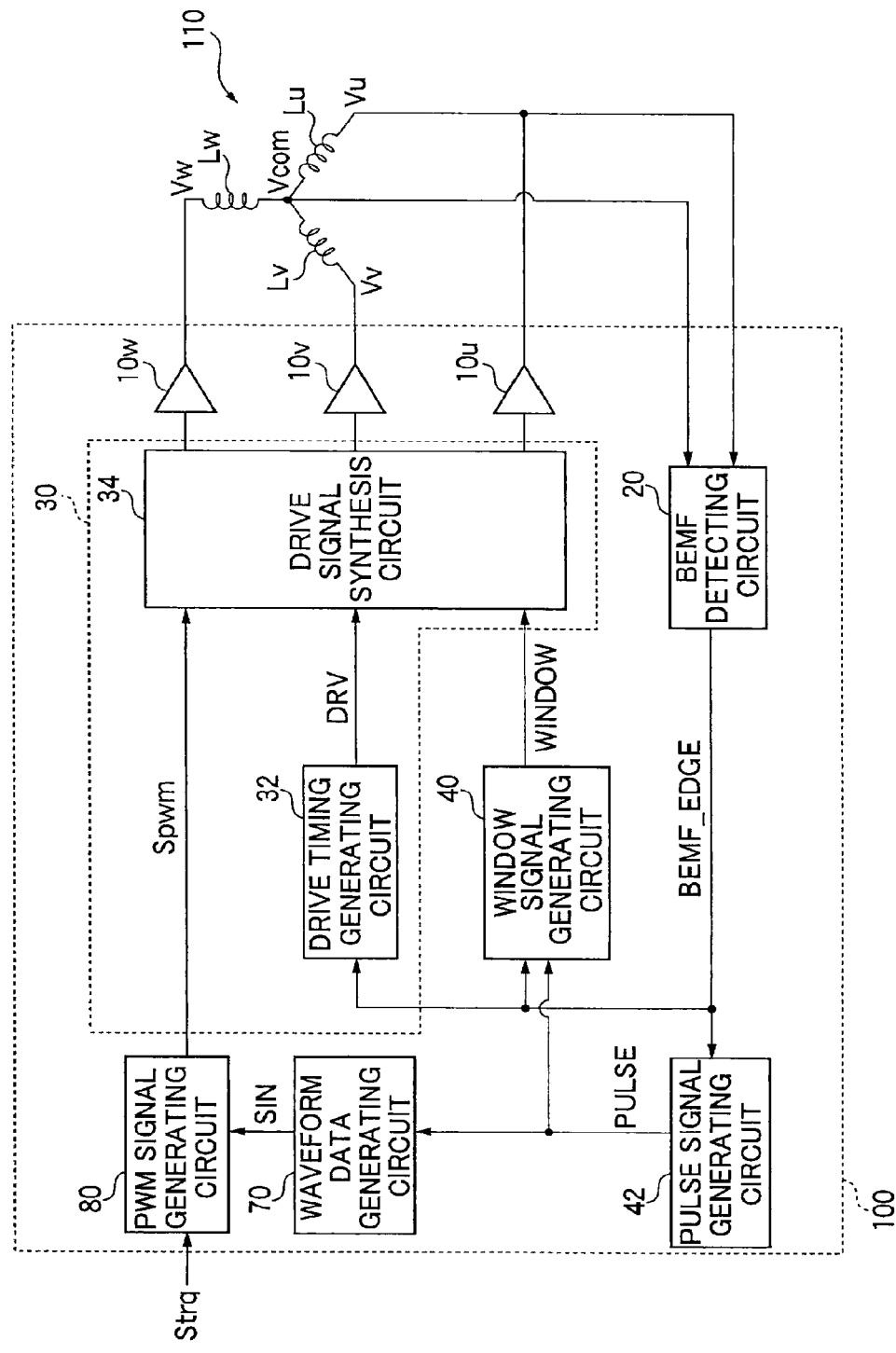
FIG. 1 is a block diagram illustrating the structure of the motor drive circuit according to an embodiment.

FIG. 1 is a block diagram illustrating the structure of the motor drive circuit 100 according to the first embodiment. The motor drive circuit 100 supplies a drive current to a sensorless brushless DC motor (hereinafter, simply referred to as a "motor 110") to control rotation of the motor. In the present embodiment, the motor 110 to be driven is a 3-phase DC motor including coils Lu, Lv and Lw of U-phase, V-phase and W-phase. In the embodiment, the motor 110 is a spindle motor in a hard disk apparatus.

The motor drive circuit 100 comprises: switching circuits 10u, 10v and 10w for each phase, which are collectively called a switching circuit 10; a Back Electro-Motive Force detecting circuit 20; a switching control circuit 30; a window signal generating circuit 40; a pulse signal generating circuit 42; a waveform data generating circuit 70; and a PWM signal generating circuit 80. The motor drive circuit 100 is integrated into one piece on a semiconductor substrate as a functional IC. For example, the motor drive circuit 100 performs Pulse Width Modulation (PWM) drive such that a current flowing thorough each phase coil has a sine wave shape.

The switching circuits 10u, 10v and 10w are provided for the coils Lu, Lv and Lw of the motor 110, respectively. The switching circuits 10u, 10v and 10w are structured to include a high-side switch and a low-side switch that are connected in series between a power supply voltage and a ground potential. A connection point between the two switches is connected to a corresponding coil. To control terminals (gates) of the high-side switch and the low-side switch, are inputted a drive signal DRV_H (U, V, W) and a drive signal DRV_L (U, V, W), respectively. The switching circuits 10u, 10v and 10w apply a high-level voltage to one end of the coil thus connected in a state where the high-side switch is in an on-state, while apply a low-level voltage in a state where the low-side switch is in an off-state. In addition, the coil is set in a high-impedance state by turning off the high-side switch and the low-side switch at the same time.

The BEMF detecting circuit 20 compares a back electro-motive force induced in at least one coil of the motor 110 with a midpoint voltage of the coils to detect a zero-cross point, and outputs a back electro-motive force detecting signal BEMF_EDGE. The BEMF detecting circuit 20 is normally structured to include a comparator. In the present embodiment, the BEMF detecting circuit 20 monitors the back electro-motive force Vu (hereinafter, also referred to as a phase voltage Vu) generated in the coil Lu of U-phase and the midpoint voltage Vcom to generate the back electro-motive force detecting signal BEMF_EDGE, which is at the high-level when Vu>Vcom. The back electro-motive force detecting signal BEMF_EDGE thus generated is outputted to the switching control circuit 30, the window signal generating circuit 40 and the pulse signal generating circuit 42.

The pulse signal generating circuit 42 receives a back electro-motive force detecting signal BEMF_EDGE outputted from the BEMF detecting circuit 20, and generates a pulse signal PULSE in synchronization with the back electro-motive force detecting signal BEMF_EDGE, the frequency of the pulse signal being obtained by multiplying the frequency of the signal BEMF_EDGE by n, where n indicates an integer of 2 or greater. The pulse signal PULSE is outputted to the waveform data generating circuit 70 and the window signal generating circuit 40.

The waveform data generating circuit 70 receives the pulse signal PULSE from the pulse signal generating circuit 42, and outputs predetermined waveform data in accordance with the pulse signal PULSE.

The PWM signal generating circuit 80 synthesizes waveform data SIN from the waveform data generating circuit 70, with a torque signal Strq indicating a target torque of the motor 110, so that a pulse width modulated signal (hereinafter, referred to as a PWM signal Spwm), the pulse width of which is modulated, is generated accordingly.

The switching control circuit 30 receives the back electro-motive force detecting signal BEMF_EDGE outputted from the BEMF detecting circuit 20 and the PWM signal Spwm outputted from the PWM signal generating circuit 80. The switching control circuit 30 controls a sequence of on/off states of the plurality of switching circuits 10u, 10v and 10w based on the back electro-motive force detecting signal BEMF_EDGE such that currents flowing through the coils Lu, Lv and Lw of the motor 110 are adjusted. The switching control circuit 30 subjects at least one of the high-side switch and the low-side switch included in each of the plurality of switching circuits 10u, 10v and 10w, to switching control based on the PWM signal Spwm. The switching control circuit 30 includes a drive timing generating circuit 32 and a drive signal synthesis circuit 34.

To the drive timing generating circuit 32, is inputted the back electro-motive force detecting signal BEMF_EDGE. The drive timing generating circuit 32 generates a drive signal DRV having a cycle obtained by multiplying the cycle Tp1 of the back electro-motive force detecting signal BEMF_EDGE by ⅙.

The drive signal synthesis circuit 34 synthesizes the drive signal DRV with the PWM signal Spwm outputted from the PWM signal generating circuit 80 to output the synthesized signal to the switching circuits 10u, 10v and 10w.

Prior to the detection of the zero-cross point by the BEMF detecting circuit 20, the window signal generating circuit 40 outputs a window signal WINDOW at the high-level. To the window signal generating circuit 40, are inputted the back electro-motive force detecting signal BEMF_EDGE from the BEMF detecting circuit 20 and the pulse signal PULSE from the pulse signal generating circuit 42. The window signal generating circuit 40 outputs the window signal WINDOW that makes a transition to the high level when m (m: an integer satisfying m<n) pieces of the pulse signals PULSE are detected after a back electro-motive force detecting signal BEMF_EDGE is detected, and that makes a transition to the low-level when the next back electro-motive force detecting signal BEMF_EDGE is thereafter detected.

It is desirable that the integer m is adjustable. For example, the motor drive circuit 100 may comprise a register for holding the integer m, which is structured such that the integer m can be set from outside.

The switching control circuit 30 receives the window signal WINDOW from the window signal generating circuit 40. The switching control circuit 30 halts, while the window signal WINDOW is being at the high-level, switching of the switching circuit 10u connected to the coil Lu, back electro-motive force of which is monitored by the BEMF detecting circuit 20 such that the switching circuit 10u is set in a high-impedance state. That is, in order to detect the zero-cross point, the switching circuit 10u is set to a phase that is not driven on purpose while the window signal WINDOW is being at the high-level. In the present embodiment, the U-phase is set to the phase not driven during a non-drive period Tp3.

Figure 2:
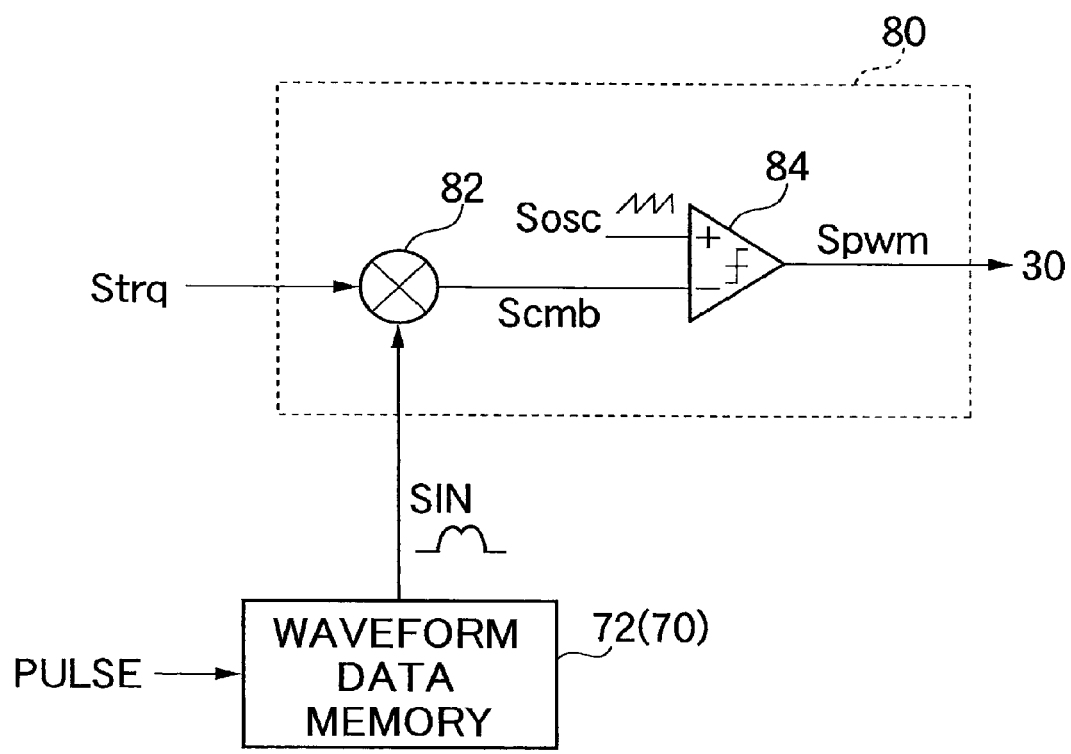
FIG. 2 is a circuit diagram illustrating the structure of a waveform data generating circuit and a PWM signal generating circuit.

FIG. 2 is a circuit diagram illustrating the structure of the waveform data generating circuit 70 and the PWM signal generating circuit 80. The waveform data generating circuit 70 includes a waveform data memory 72. Predetermined waveform data SIN is recorded and stored in the waveform data memory 72. The waveform data generating circuit 70 sequentially reads and outputs the waveform data SIN in accordance with the pulse signal PULSE. The motor drive circuit 100 according to the present embodiment has a feature in the waveform data SIN. The waveform data SIN will be described in detail below.

The waveform data SIN is one obtained by sampling over a predetermined period the back electro-motive force induced at one end of at least one phase coil, while the motor 110 is rotated at a predetermined rotational speed and one end of each phase coil Lu, Lv and Lw is set in a high impedance state. A method for generating the waveform data SIN will be described in detail below.

The PWM signal generating circuit 80 includes a synthesis unit 82 and a pulse width modulator 84. The synthesis unit 82 synthesizes data by multiplying the waveform data SIN outputted from the waveform data generating circuit 70 by the torque signal Strq from outside. The multiplication result is outputted from the synthesis unit 82 to the pulse width modulator 84 as a synthesized signal Scmb. The pulse width modulator 84 compares the synthesized signal Scmb from the synthesis unit 82 with a predetermined periodic signal Sosc to generate the PWM signal Spwm. The periodic signal Sosc is one, signal level of which varies in a triangle wave pattern or a saw-tooth wave pattern. A pulse width of the PWM signal Spwm thus generated varies in accordance with the magnitude relationship between the synthesized signal Scmb and the periodic signal Sosc.

Figure 3:
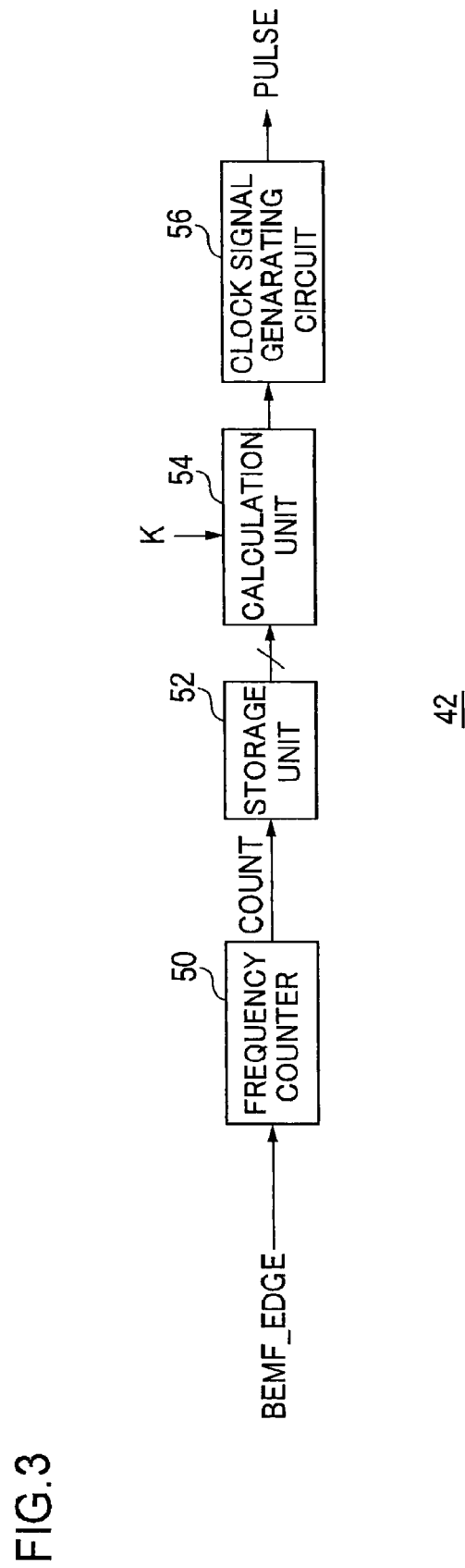
FIG. 3 is a block diagram illustrating the structure of a pulse signal generating circuit.

FIG. 3 is a block diagram illustrating the structure of the pulse signal generating circuit 42. The pulse signal generating circuit 42 comprises: a frequency counter 50; and a clock signal generating circuit 56.

The frequency counter 50 measures the frequency, i.e., the cycle Tp1 of the back electro-motive force detecting signal BEMF_EDGE. For example, to the frequency counter 50, is inputted a clock signal (not illustrated) having a predetermined frequency. The frequency counter 50 counts the clock signals inputted during a period from the input of a back electro-motive force detecting signal BEMF_EDGE to the input of the next back electro-motive force detecting signal BEMF_EDGE, so that the cycle Tp1 of the back electro-motive force detecting signal BEMF_EDGE is measured. The frequency counter 50 sequentially outputs a count value COUNT thus measured as a frequency value.

The clock signal generating circuit 56 generates the pulse signal PULSE obtained by multiplying the frequency measured by the frequency counter 50 by n (n: an integer of 2 or more). That is, the cycle Tp2 of the pulse signal PULSE is set to the value obtained by multiplying the cycle Tp1 of the back electro-motive force detecting signal BEMF_EDGE by 1/n.

The clock signal generating circuit 56 calculates the frequency values COUNT for the past K (k: an integer of 1 or more) times of frequencies measured by the frequency counter 50. The clock signal generating circuit 56 sets the frequency of the pulse signal to be generated in accordance with the calculation result. It is preferable that the integer K corresponding to the pieces of the frequency values to be calculated is adjustable.

In order to realize the function, the pulse signal generating circuit 42 comprises in the stage preceding the clock signal generating circuit 56: a storage unit 52; and a calculation unit 54. The storage unit 52 holds the frequency values COUNT for the past L (L: an integer satisfying L≧K) times of frequencies. The storage unit 52 may be, for example, a shift register having L levels. The calculation unit 54 executes a predetermined calculation based on the frequency values held in the storage unit 52. The calculation processing may be simple averaging or weighted averaging.

The clock signal generating circuit 56 generates the pulse signal PULSE having a frequency in accordance with the calculation result by the calculation unit 54. For example, the calculation unit 54 calculates the frequency values for the latest K times thereof among the frequency values for the L times thereof, which are held in the storage unit 52, so that the frequency of the pulse signal PULSE is determined. The calculation processing may be simple averaging of K pieces of the count values or weighted averaging of the same. It is desirable that the integer K is configured so as to be variable and be able to be set from outside, as stated above. When K=1, the cycle Tp2 of the pulse signal PULSE is set in accordance with the cycle Tp1 of the immediately preceding back electro-motive force detecting signal BEMF_EDGE.

Figure 4:
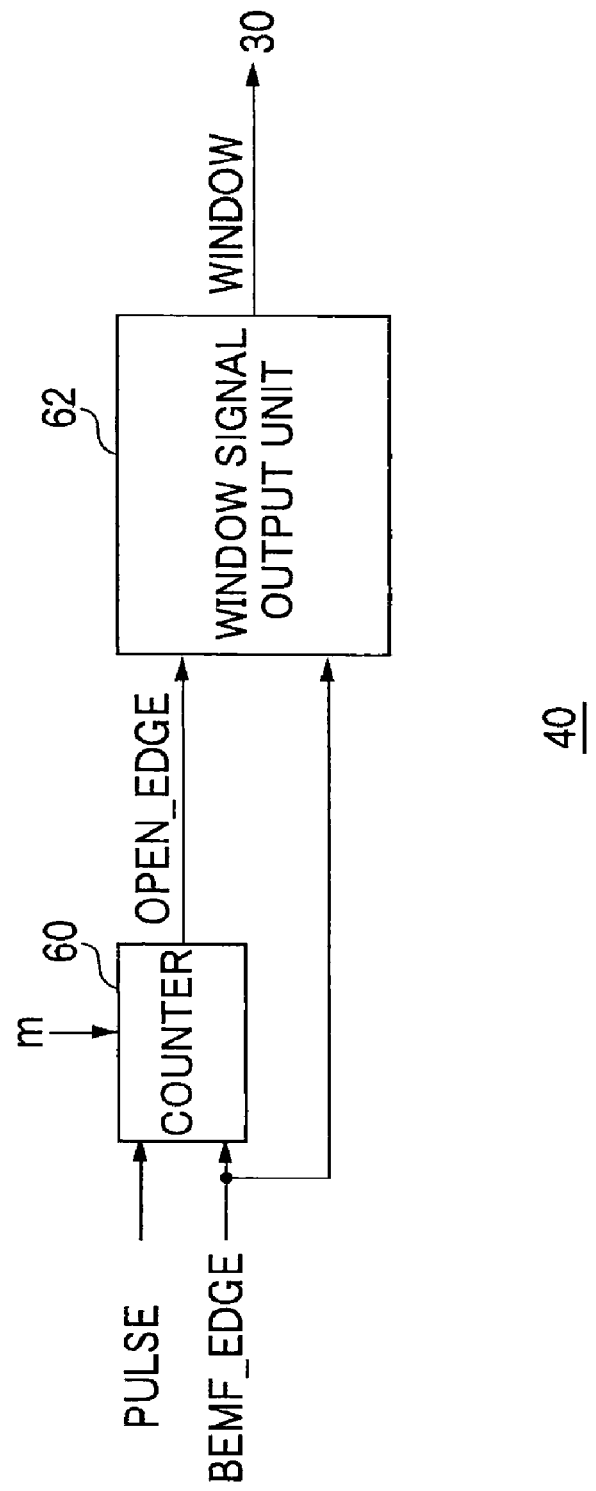
FIG. 4 is a circuit diagram illustrating the structure of a window signal generating circuit.

FIG. 4 is a circuit diagram illustrating the structure of the window signal generating circuit 40. The window signal generating circuit 40 includes a counter 60 and a window signal output unit 62. To the window signal generating circuit, are inputted the back electro-motive force detecting signal BEMF_EDGE outputted from the BEMF detecting circuit 20 and the pulse signal PULSE outputted from the pulse signal generating circuit 42.

The counter 60 outputs an open edge signal OPEN_EDGE that makes a transition to the high-level when m pieces of the pulse signals PULSE are counted after a back electro-motive force detecting signal BEMF_EDGE is detected. The window signal output unit 62 outputs the window signal WINDOW that makes a transition to the high-level when the open edge signal OPEN_EDGE at the high level is outputted from the counter 60, and that makes a transition to the low-level when the next back electro-motive force BEMF_EDGE is thereafter detected.

Subsequently, the waveform data held in the waveform data generating circuit 70 will be described. The waveform data is one that is the base of the PWM signal used in subjecting the motor 110 to the pulse modulated drive, which is generated in the following processes:

Step 1: the motor 110 is rotated at a predetermined rotational speed; step 2: a back electro-motive force induced at one end of at least one phase coil is sampled over a predetermined period, with one end of each phase coil of the motor 110 being set in a high impedance state; and step 3: the sampled back electro-motive force is held as waveform data.

In the step 1, the rotational speed of the motor 110 is stabilized at a predetermined value by subjecting the switching circuits 10*u*, 10*v* and 10*w* to the switch driving. It is desirable that the rotational speed of the motor 110 in this case is equal to the rotational speed of a disk in practical use of a hard disk apparatus. For example, in the case of a hard disk apparatus having the disk rotational speed of 7200 rpm, the motor 110 is rotated at 7200 rpm.

In the step 2, one end of each of the all phase coils Lu, Lv and Lw is preferably set in a high impedance state. That is, the motor 110 is subjected to idle running with all of the high-side switches and the low-side switches of the switching circuits 10*u*, 10*v* and 10*w* being turned off. In the state, back electro-motive forces are generated at one end of each of the coils Lu, Lv and Lw.

Alternatively, the coils other than the coil, back electro-motive force of which is to be measured, may be subjected to switching, instead of one end of each of the all phase coils being set in a high impedance state.

In the step 3, only a back electro-motive force induced at a single phase coil (for example, Lu) may be sampled. And, waveform data obtained by sampling the back electro-motive force induced in the U-phase coil is used for driving the all phase coils (V-phase, W-phase). In this case, a memory capacity can be reduced because the waveform data for one phase is sufficient for three phases.

Alternatively, in the step 3, waveform data for each phase may be generated by sampling the respective back electro-motive forces induced in the all phase coils Lu, Lv and Lw. In this case, the coil current can be brought close to the ideal sine wave in subjecting the motor 110 to the PWM drive because optimal waveform data can be obtained for each phase, although the memory capacity needs to be large.

Figure 5A:
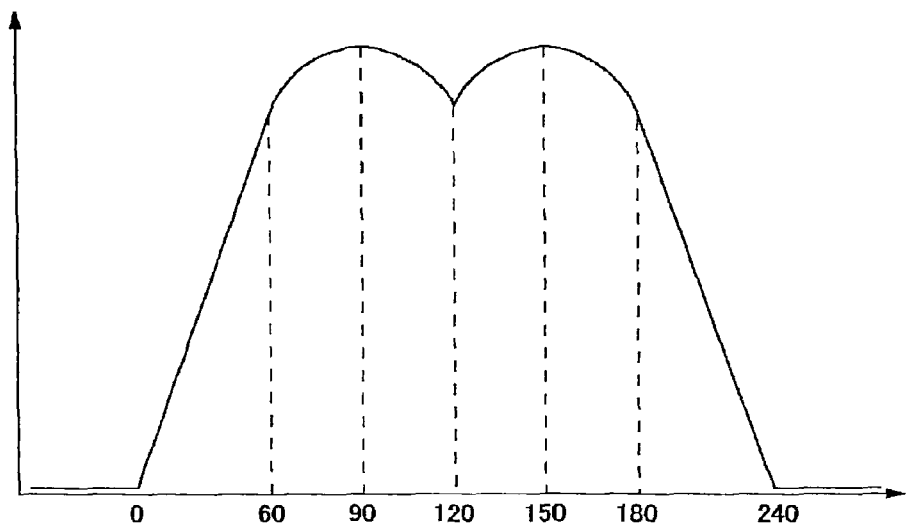
FIGS. 5A and 5B are diagrams illustrating waveform data (racing waveform) in accordance with a back electro-motive force while the motor is running idle.
Figure 5B:
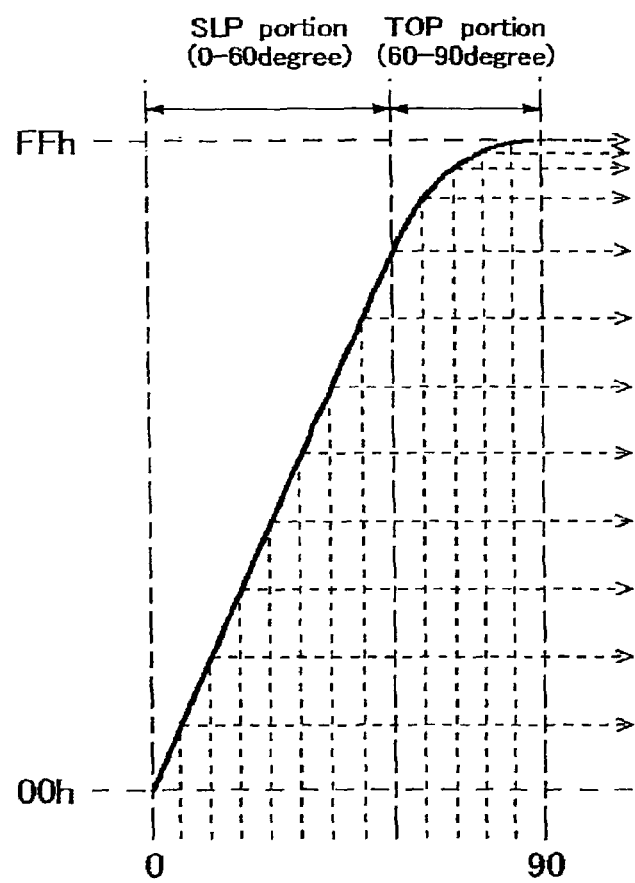

FIGS. 5A and 5B are diagrams illustrating waveform data (racing waveform) in accordance with a back electro-motive force while the motor is running idle. In the case where the motor 110 is driven by the 120 degrees excitation method, it is desirable that the back electro-motive force is sampled by either of the following methods. The waveforms in FIGS. 5A and 5B illustrate the waveforms when subjecting the high-side switches of the switching circuits 10*u*, 10*v* and 10*w* to the PWM drive. It can be appreciated by those skilled in the art that the racing waveforms different from each other between the case of subjecting the low-side switches to the PWM drive and the case of subjecting both the high-side switches and the low-side switches to the same, are obtained.

As illustrated in FIG. 5A, the racing waveform has a significant value within the electrical angle range of 0 to 240°. Therefore, the back electro-motive force is sampled over the whole range of 0 to 240° (method 1). In this case, the coil current can be brought closest to the most ideal sine wave, although a memory capacity required is large.

In another method, the back electro-motive force is sampled over a predetermined electrical angle less than 240°. When generating the PWM signal within the range where sampling is not performed, of the electrical angle range of 0 to 240°, the waveform data with respect to the sampled electrical angle is used.

As illustrated in FIG. 5A, it can be approximated that the racing waveform within the range of 0 to 120° and that of the range of 120 to 240° are symmetrical to each other with respect to the time axis. When the approximation holds, the back electro-motive force is sampled during a predetermined period corresponding to the electrical angle range of 0 to 120°. The PWM signal within the range of 0 to 120° is generated by using the waveform data within the same range, which is actually sampled. The PWM signal within the range of 120 to 240° is generated by inverting the sampled waveform data within the range of 0 to 120° with respect to the time axis (method 1).

According to the method 1, a memory capacity can be reduced to half that in the method 1.

Referring to FIG. 5B, it can be approximated that the racing waveform within the range of 60 to 90° and that within the range of 90 to 120° are symmetrical to each other with respect to the time axis. When the approximation holds, the back electro-motive force is sampled during a predetermined period corresponding to the range of 0 to 90°. The PWM signal within the range of 0 to 90° is generated by using the sampled waveform data within the same range. The PWN signal within the range of 90 to 120° is generated by inverting the sampled waveform data within the range of 60 to 90° with respect to the time axis. The PWM signal within the range of 120 to 150° is generated by using the sampled waveform data within the range of 60 to 90°. Further, the PWM signal within the range of 150 to 240° is generated by inverting the sampled waveform data within the range of 0 to 90° with respect to the time axis (method 2).

FIG. 5B is a diagram illustrating processes of sampling the back electro-motive force by the method 2. The back electro-motive force at the electrical angle of 90° is divided into, for example, 48 pieces in the time axis direction, and the amplitude at each sampling point is quantized using 8 bits. The quantization bit number and the sampling rate may be another values.

According to the method 2, a memory capacity can be further reduced as compared to that in the method 1.

Silence of the motor and the memory capacity realized by the respective methods 1 to 3 are in a trade-off relationship. Accordingly, any one of the methods has to be selected in accordance with the required silence and the memory capacity implementable in the motor drive circuit 100.

Figure 6:
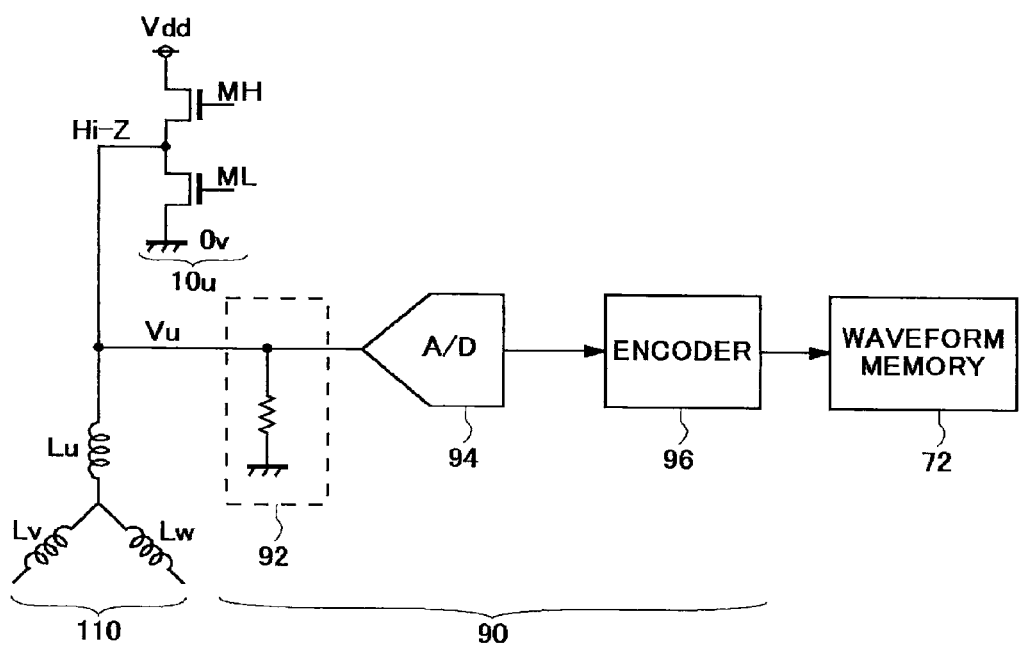
FIG. 6 is a circuit diagram illustrating a sampling circuit for generating the waveform data.

FIG. 6 is a circuit diagram illustrating the sampling circuit for generating the waveform data according to the first embodiment. The sampling circuit 90 includes a bias circuit 92, an A/D converter 94 and an encoder 96. The case where the back electro-motive force Vu of U-phase is measured is described with reference to FIG. 6.

If the motor 110 is subjected to idle running, a potential Vu at one end of the coil Lu becomes a sine wave-shaped waveform, center voltage of which is equal to the midpoint voltage of the coils, and the racing waveform illustrated in FIG. 5A cannot be obtained. The bias circuit 92 is provided for converting the potential Vu of the coil Lu into a desired waveform. When subjecting the high-side switch MH side of the switching circuits 10u, 10v and 10w of the motor drive circuit 100 to the PWM drive, the bias circuit 92 can be structured by a pull-down resistor connected to ground potential (0 V) as illustrated in FIG. 6. In contrast, when subjecting the low-side switch ML side to the PWM drive, the bias circuit 92 can be structure by a pull-up resistor connected to the power supply voltage (Vdd). When subjecting both the high-side switch and the low-side switch to the PWM drive, the bias circuit 92 can be structure by both the pull-up resistor and the pull-down resistor.

The A/D converter samples the back electro-motive force Vu, level of which is shifted by the bias circuit 92, and subjects the force Vu to A/D conversion. The waveform data of the back electro-motive force Vu thus digitized is inputted to the encoder 96. The encoder normalizes the waveform data and extracts data with respect to an electrical angle range in accordance with any one of the aforementioned methods 1 to 3. The extracted waveform data is written into the waveform data memory 72.

It is desirable that the waveform data SIN recorded in the waveform data memory 72 of a motor drive circuit 100 is measured with respect to an individual piece of the motor 110 that the motor drive circuit 100 is intended to drive. From this viewpoint, the sampling circuit 90 may be integrated in the motor drive circuit 100. By providing in the motor drive circuit 100 the sampling circuit 90 for monitoring the back electro-motive force while the motor 110 is running idle, waveform data optimal for the motor 110 to be driven can be generated by the motor drive circuit 100.

In this case, the sampling circuit 90 may sample the waveform data at every power-on operation, or sample the waveform data only once prior to shipment of the products in the mass production stage.

Alternatively, the sampling circuit 90 may not be incorporated in the motor drive circuit 100. Namely, the waveform data sampled by the sampling circuit 90 outside the motor drive circuit 100 only has to be written into the waveform data memory 72 of the waveform data generating circuit 70. Even in the case, it is possible that the waveform data of each individual piece of the motor 110 is measured and written into the waveform data memory 72.

Common waveform data may be used for motors 110 of the same type. In this case, the waveform data may be measured by the sampling circuit 90 with respect to a typical sample of the motor 110, with the use of the aforementioned procedure; and the measured data be used for other motors 110. This is effective in the case where there is a small variation among a plurality of motors 110 of the same type.

Alternatively, average waveform data may be generated from the waveform data measured with respect to a plurality of samples of the motor 110 by using statistical means such that the average data is used for driving all motors 110.

Operations of the motor drive circuit 100 structured as stated above will be described. FIGS. 7A to 7I are time charts illustrating operations of the motor drive circuit 100 according to the embodiment. In order to facilitate understanding thereof, the vertical axes and the horizontal axes of the drawings are appropriately enlarged or reduced, and each waveform illustrated herein is simplified. FIGS. 7A to 7C illustrate waveforms that show drive states of the coils Lu, Lv and Lw of U-phase, V-phase and W-phase driven by the switching circuits 10u, 10v and 10w, respectively. FIG. 7D illustrates the back electro-motive force detecting signal BEMF_EDGE detected by the BEMF detecting circuit 20; FIG. 7E the drive signal DRV generated by the drive timing generating circuit 32; and FIG. 7F the window signal WINDOW generated by the window signal generating circuit 40. FIGS. 7G to 7I illustrate the drive signals DRV_H and DRV_L of the high-side switches and the low-side switches of the switching circuits 10u to low.

As illustrated in FIGS. 7A to 7C, in the present embodiment, the coils are driven such that their drive currents become sine waves having 120° phase displacement with respect to each other, with the use of the sine wave-shaped waveform data SIN. In the present embodiment, the back electro-motive force detecting signal BEMF_EDGE is generated for each zero-cross point where the back electro-motive force Vu intersects with the midpoint voltage Vcom as illustrated in FIG. 7D.

The drive timing generating circuit 32 generates the drive signal DRV, illustrated in FIG. 7E, which is obtained by multiplying the cycle Tp1 of the back electro-motive force detecting signal BEMF_EDGE by 1/6. The pulse signal generating circuit 42 generates the pulse signal PULSE in synchronization with the back electro-motive force detecting signal BEMF_EDGE, frequency of which is obtained by multiplying that of the signal BEMF_EDGE. The waveform data generating circuit 70 generates the sine wave-shaped waveform data in accordance with the pulse signal PULSE. Accordingly, a current flowing through each coil Lu, Lv and Lw is controlled in synchronization with the back electro-motive force detecting signal BEMF_EDGE, as illustrated in FIGS. 7A to 7C.

As illustrated herein, the drive signal DRV may be provided with a certain delay Td relative to the back electro-motive force detecting signal BEMF_EDGE. Drive of the motor can be optimized by adjusting the delay Td. In this case, a delay circuit has to be provided in the subsequent stage of the BEMF detecting circuit 20.

The drive signal synthesis circuit 34 generates the drive signals DRV_H (U, V, W) and DRV_L (U, V, W) for controlling on/off of the switching circuits 10u to 10w based on the drive signal DRV generated by the drive timing generating circuit 32. The drive sequence is set appropriately in accordance with a conduction angle or the like.

In the drive signal DRV_HU illustrated in FIG. 7G, the high-level of the signal corresponds to an on-state of the high-side switch of the switching circuit 10u while the low-level thereof to an off-state of the same. The same is true for the drive signals DRV_H (V, W) and DRV_L (U, V, W) illustrated in FIGS. 7G to 7I. On-state of at least one of the high-side switch and the low-side switch is controlled based on the PWM signal Spwm such that the drive waveforms illustrated in FIGS. 7A to 7C are obtained.

The window signal WINDOW illustrated in FIG. 7F is made a transition to the high-level by the window signal generating circuit 40 prior to the time when the zero-cross point occurs. While the window signal generating circuit 40 is being at the high-level, the drive signal synthesis circuit 34 makes the drive signals DRV_HU and DRV_LU, which are to be outputted to the switching circuit 10u, be at the low-level, and makes the drive signals be in a high impedance state by turning off the high-side switch and the low-side switch. In FIGS. 7G and 7J, in order to detect the zero-cross point, periods during which the drive signals are set in a high impedance state are illustrated by diagonal lines, respectively. When the window signal WINDOW makes a transition to the high level and one end of the coil Lu is set in a high impedance state, the zero-cross point can be detected, allowing the back electro-motive force detecting signal BEMF_EDGE to be generated. When the back electro-motive force detecting signal BEMF_EDGE makes a transition to the high-level, the window signal generating circuit 40 makes the window signal WINDOW be at the low-level. As illustrated in FIG. 7A, the coil current is discontinuous when the switching circuit 10 is set in a high impedance state.

FIGS. 8A to 8D are time charts illustrating processes of generating the window signal WINDOW. FIG. 8A illustrates the back electro-motive force detecting signal BEMF_EDGE; FIG. 8B the pulse signal PULSE generated by the pulse signal generating circuit 42; FIG. 8C the open edge signal OPEN_EDGE generated by the counter 60; and FIG. 7D the window signal WINDOW.

When the back electro-motive force detecting signal BEMF_EDGE is at the high-level, the frequency counter 50 in FIG. 3 starts counting, and outputs to the storage unit 52 the count value COUNT counted before the back electro-motive force detecting signal BEMF_EDGE is at the high-level next time. At least one count value COUNT of the past is held in the storage unit 52. If the cycle of a clock used in counting by the frequency counter 50 is Tck, the cycle Tp1 of the back electro-motive force detecting signal BEMF_EDGE is Tck× COUNT. The calculation unit 54 determines the cycle Tp2 of the pulse signal PULSE by using the count values of the past K times such that Tp2=Tp1/n holds. As a result, the cycle Tp2 of the pulse signal PULSE outputted from the pulse signal generating circuit 42 is one obtained by multiplying the cycle Tp1 of the back electro-motive force detecting signal BEMF_ EDGE by 1/n, as illustrated in FIG. 8B.

When a back electro-motive force detecting signal BEMF_ EDGE makes a transition to the high-level at the time t0, the counter 60 in FIG. 4 starts counting the pulse signal PULSE from the pulse signal generating circuit 42. When counting m pieces of the pulse signals PULSE at the time t1, the counter 60 outputs the open edge signal OPEN_EDGE at the high level as illustrated in FIG. 7C.

The window signal output circuit 62 makes the window signal WINDOW be at the high-level between the time when the open edge signal OPEN_EDGE makes a transition to the high-level at the time t1, and the time when the back electromotive force detecting signal BEMF_EDGE thereafter makes a transition to the high-level at the time t2.

Figure 9:
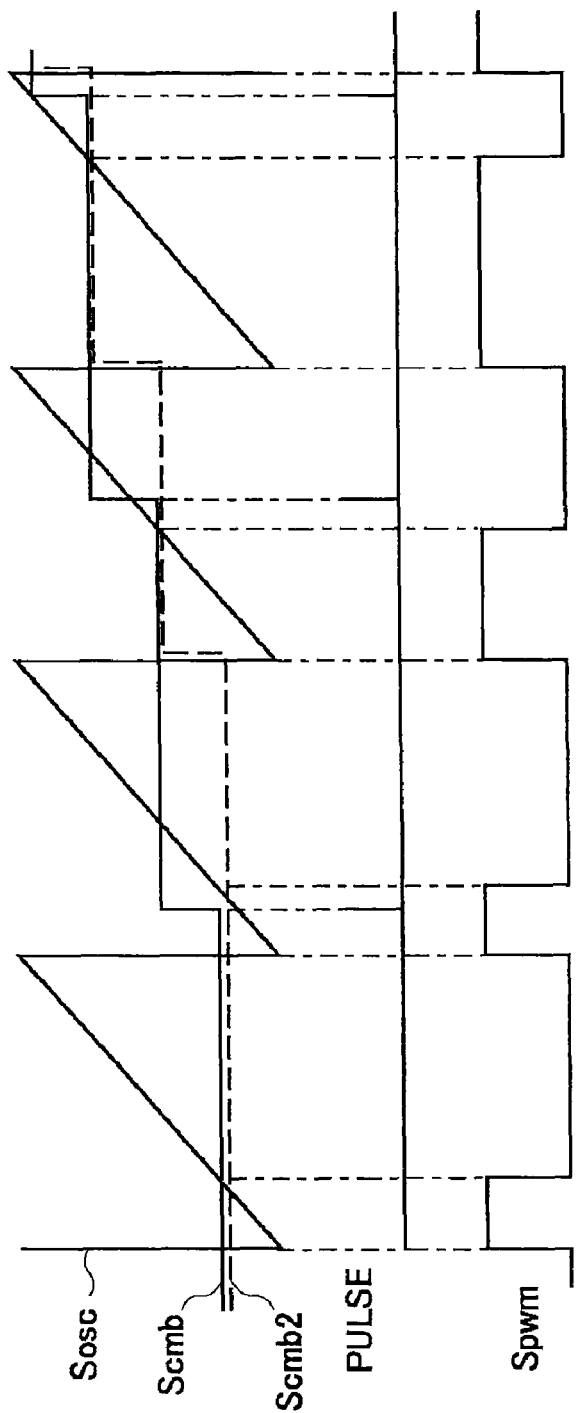
FIG. 9 is a time chart illustrating operations of the waveform data generating circuit in FIG. 2 and the PWM signal generating circuit.

FIG. 9 is a time chart illustrating operations of the waveform data generating circuit 70 in FIG. 2 and the PWM signal generating circuit 80.

The waveform data generating circuit 70 in FIG. 2 reads new waveform data SIN at every edge of the pulse signal PULSE in FIG. 8B to update the value. The synthesis unit 82 updates the synthesized signal Scmb by multiplying the updated waveform data SIN by the torque signal Strq.

The periodic signal Sosc is a saw-tooth wave signal generated by a counter in which the count is increased by a predetermined frequency and reset to zero when reaching its full count. The pulse width modulator 84 latches the synthesized signal Scmb at a negative edge timing of the saw-tooth wave, i.e., the timing when the counter is reset. The pulse signal Spwm, level of which makes a transition at every cross-point, is generated by comparing the synthesized signal Scmb2 after latched by the pulse width modulator 84 with the periodic signal Sosc.

Operations of the motor drive circuit 100 have been described above. According to the motor drive circuit 100, the following effects can be obtained.

In the motor drive circuit 100 according to the present embodiment, the waveform data SIN for subjecting the motor 110 to the PWM drive is generated based on the back electromotive force while the motor is running idle. Accordingly, the coil currents flowing through the coils Lu, Lv and Lw can be brought close to the ideal sine wave, allowing a drive noise of the motor 110 to be reduced and silence thereof to be enhanced.

Further, in the motor drive circuit 100 according to the present embodiment, the pulse signal PULSE in synchronization with the back electro-motive force detecting signal BEMF_EDGE is generated, and powers supplied to the coils Lu, Lv and Lw are subjected to the PWM control based on the pulse signal PULSE. In order to generate the waveform data SIN in accordance with the pulse signal PULSE, the waveform data generating circuit 70 can make the frequency of the waveform data SIN proportional to the rotational sped of the motor. As a result, a sine wave-shaped power can be supplied to the coils in accordance with a rotor position of the motor 110, allowing stable sine wave drive to be realized and the motor 110 to be stably rotated at a desired torque.

Furthermore, in the motor drive circuit 100 according to the present embodiment, the window signal WINDOW, which is at the high-level during a period obtained by multiplying the cycle Tp1 of the back electro-motive force detecting signal BEMF_EDGE outputted from the BEMF detecting circuit 20 by a predetermined coefficient (1−m/n), is generated prior to the detection of the zero-cross point; and the period during which the window signal WINDOW is at the high-level is set to a non-drive period Tp3 for detecting the zero-cross point. As a result, the non-drive period Tp3 can be adaptively set in accordance with the rotational speed of the motor. In addition, when the non-drive period is fixed as conventionally performed, there is a need for beforehand setting the long non-drive period; however, according to the present embodiment, there is no need for setting the period to one that is longer than necessary, allowing a drive current of the motor to be smoothed and a noise emanating from the motor to be reduced.

In the present embodiment, the window signal WINDOW is a common signal with the pulse signal PULSE used for generating the waveform data SIN. Accordingly, the timing when the window signal WINDOW is at the high-level can be aligned with that when the level of the sine wave-shaped waveform data SIN is zero, allowing the zero-cross point to be detected more accurately.

Still further, the window signal generating circuit 40 has made the window signal WINDOW be at the high-level after a lapse of a period obtained by multiplying the cycle Tp1 of a back electro-motive force detecting signal BEMF_EDGE by the coefficient (1−m/n) from when the signal BEMF_EDGE is outputted; and thereafter has made the window signal WIN- DOW be at the low-level, taking the opportunity when the next back electro-motive force detecting signal BEMF_EDGE is outputted from the BEMF detecting circuit 20. As a result, the timing when the switching circuit 10*u* is set in a high impedance state can be surely set prior to the detection of the zero-cross point.

Still further, in the embodiment, the number m of pieces of the pulse signal PULSE to be counted is made to be adjustable in the window signal generating circuit 40. As a result, the length of the non-drive period Tp3 can be varied in accordance with the type of the motor to be driven, allowing stable motor drive to be realized.

Still further, in the embodiment, the integer K is made to be adjustable in the pulse signal generating circuit 42. As a result, when the integer K is set to a small one, a follow-up property to a variation in the rotational speed of the motor can be set to a large one because a feedback loop gain is raised. Conversely, when K is set to a large one, the feedback loop can be more stabilized because the feedback loop gain is lowered. Accordingly, optimal motor drive can be realized by setting the value of K in accordance with the type, a rotational speed and a drive method of the motor.

Figure 10:
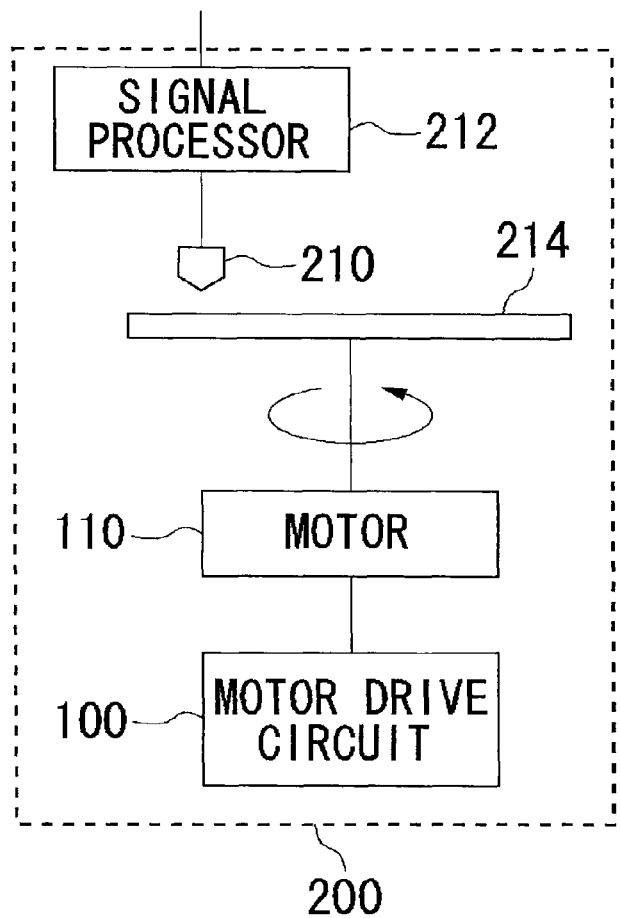
FIG. 10 is a block diagram illustrating the structure of a hard disk apparatus mounting the motor drive circuit in FIG. 1.

Subsequently, application examples of the motor drive circuit 100 according to the present embodiment will be described. FIG. 10 is a block diagram illustrating the structure of a hard disk apparatus 200 mounting the motor drive circuit 100 in FIG. 1. The hard disk apparatus 200 includes a magnetic head 210, a disk 214, a signal processor 212, the motor 110, and the motor drive circuit 100.

The magnetic head 210 writes data into the disk 214 by applying magnetism to the disk, or converts the magnetic field in accordance with the data written in the disk 214 into an electrical signal. The signal processor 212 performs necessary signal processing such as amplification processing, A/D conversion, or D/A conversion, with respect to the data to be read from or written in the disk 214. The motor 110 is a spindle motor provided for rotating the disk 214. Because silence is required for the hard disk apparatus 200 as illustrated in FIG. 10, the apparatus 200 is preferable as an application of the motor drive circuit 100 according to the embodiment.

(Second Embodiment)

In the first embodiment, the technique in which waveform data is generated by sampling a back electro-motive force while the motor is running idle, has been described. In the second embodiment, a technique in which the waveform data is updated in accordance with the motor drive state will be described in addition to or instead of the technique of the first embodiment.

Figure 11:
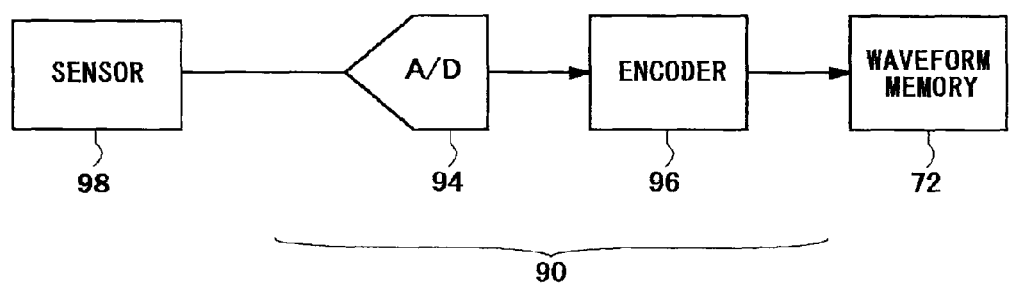
FIG. 11 is a circuit diagram illustrating the sampling circuit for generating waveform data according to the second embodiment.

FIG. 11 is a circuit diagram illustrating the sampling circuit for generating waveform data according to the second embodiment. The sampling circuit 90 includes an A/D converter 94 and an encoder 96.

A sensor 98 measures a physical quantity indicating a rotational state of the motor 110 to generate a signal indicating the measured physical quantity. For example, the sensor 98 is a shock sensor provided in the periphery of the motor 110, which measures the vibration caused due to the rotation of the motor 110.

A general hard disk apparatus is provided with a mechanism for preventing the head from being in contact with a disk due to vibration and provided with a vibration sensor for detecting the vibration. Accordingly, when the motor drive circuit 100 according to the embodiment is mounted in the hard disk apparatus, the shock sensor can be used.

The A/D converter 94 samples an output signal from the sensor 98 to convert it into a digital signal. The encoder 96 updates the waveform data stored in the waveform data memory 72 such that the output signal from the A/D converter 94 is brought close to a certain target value, i.e., an amount of vibration is reduced. In the present embodiment, algorithms for optimizing the waveform data are not particularly limited. The waveform data may be updated based on so-called feedback processing. Or, the waveform data may be updated such that the amount of vibration is reduced, repeating trial-and-error. For example, several types of the waveform data determined beforehand may be checked in turn to select one by which the amount of vibration is smallest, which may be written into the waveform data memory 72.

The sensor 98 and the sampling circuit 90 may perform processing of updating the waveform data at every predetermined timing.

According to this embodiment, the motor can be rotated more smoothly because the waveform data can be subjected to tuning.

The sensor 98 may be an acoustic sensor. In this case, the sampling circuit 90 can subject the waveform data to tuning so as to reduce the noise caused due to the rotation of the motor.

Alternatively, the sensor 98 may be a power meter (ammeter) for measuring power consumption of the motor drive system from the ecological point of view. In this case, the power consumption can be reduced. Or, the sensor 98 may be a temperature sensor for measuring a temperature of the motor 110. In this case, the temperature of the motor 110 can be lowered, i.e., heat generation can be suppressed.

Figure 12:
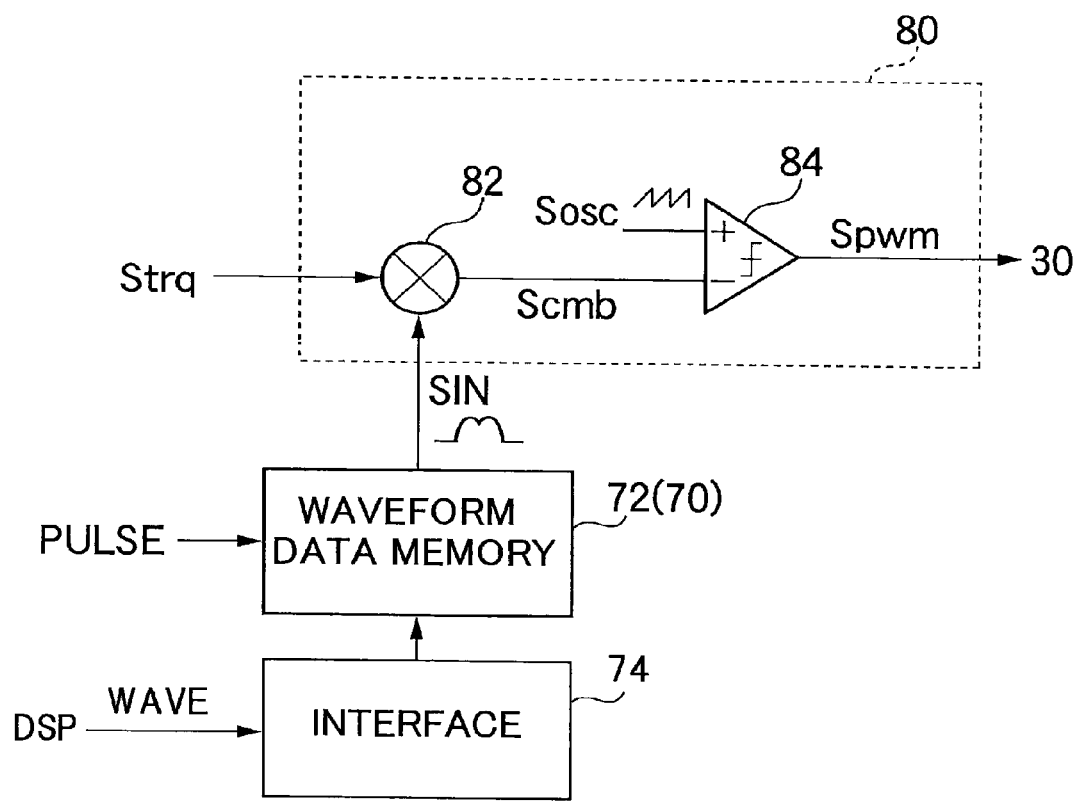
FIG. 12 is a circuit diagram illustrating a variation of the motor drive circuit in FIG. 2.

FIG. 12 is a circuit diagram illustrating a variation of the motor drive circuit 100 in FIG. 2. The motor drive circuit 100 further comprises an interface circuit 74 that receives waveform data WAVE from an outside processor (DSP) to write the data into the waveform data memory 72. According to this variation, the waveform data can be freely written or rewritten from outside.

Figure 13:
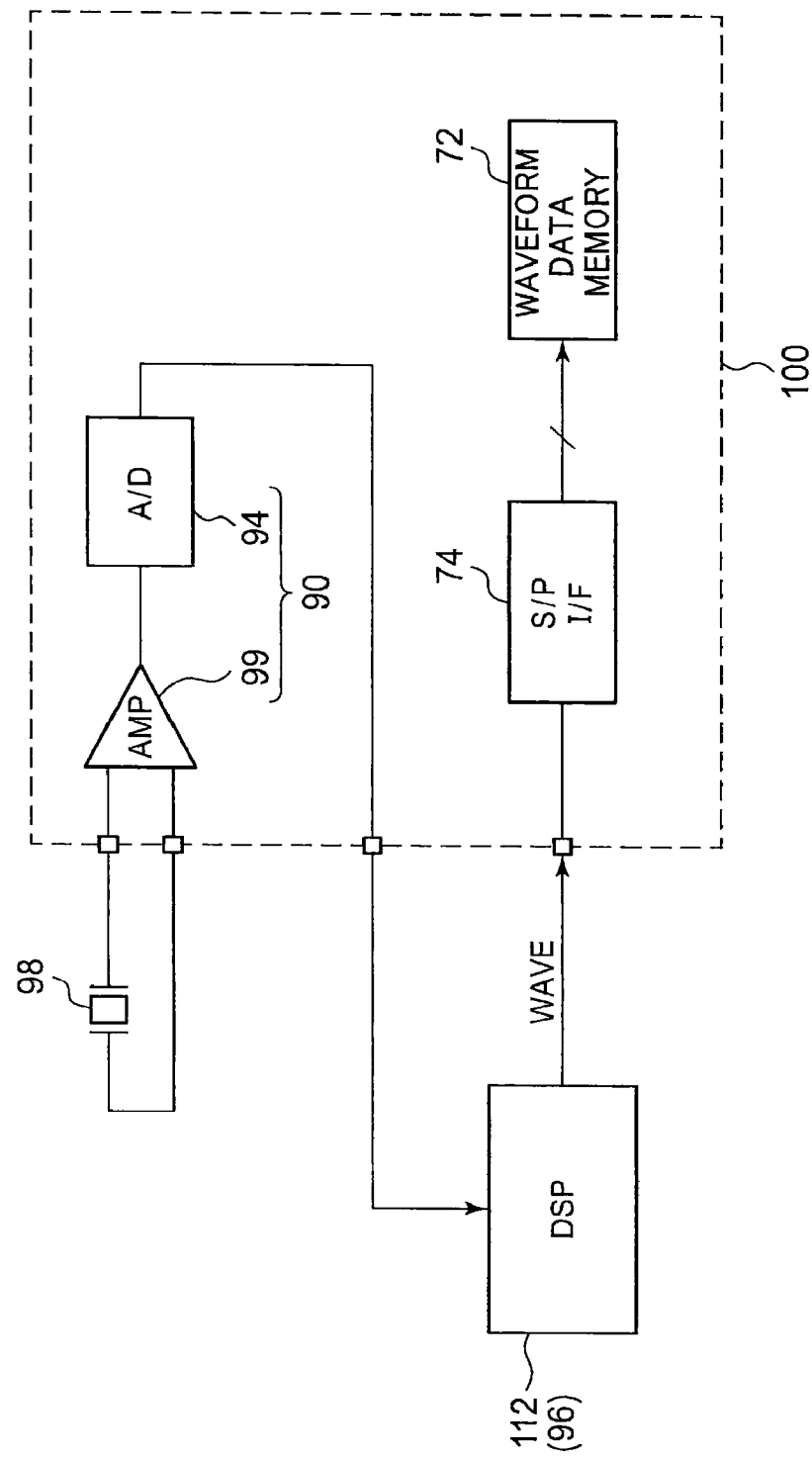
FIG. 13 is a circuit diagram illustrating the structure of a variation of the motor drive circuit in FIG. 11.

FIG. 13 is a circuit diagram illustrating the structure of a variation of the motor drive circuit in FIG. 11. It can be understood that the motor drive circuit in FIG. 13 is a combination of those in FIGS. 11 and 12.

The sensor 98 is, for example, a shock sensor. The amplifier 99 amplifies an output signal from the shock sensor. The A/D converter 94 converts an output signal from the amplifier 99 into a digital signal D1. The digital signal D1 is outputted to the outside processor 112 through an interface circuit, which is not illustrated.

The processor 112 receives the digital signal D1 indicating an amount of vibration, and generates the waveform data WAVE by which the amount of vibration is reduced. That is, the processor 112 corresponds to the encoder 96 in FIG. 11. The waveform data WAVE is transmitted to the motor drive circuit 100 in a predetermined format (for example, serial data format). The interface circuit 74 converts the waveform data in a serial data format into that in a parallel format to write the data into the waveform data memory 72.

According the structure in FIG. 13, sophisticated signal processing can be preformed because the processing capability of the outside processor 112 and a memory associated with the processor can be utilized, as compared to the case where the encoder 96 is incorporated in the motor drive circuit 100.

While the preferred embodiments of the present invention have been described using specific terms, such description is for illustrative purposes only, and it is to be understood that changes and variations may be made without departing from the spirit or scope of the appended claims.

What is claimed is:

1. A method for generating waveform data, which is the base of a pulse modulated signal used in subjecting a multiphase DC motor to the pulse modulated drive, the method comprising:
   rotating the multiphase DC motor at a predetermined rotational speed;
   sampling over a predetermined period a back electro-motive force induced at one end of at least one phase coil of the multiphase DC motor, with one end of each phase coil being set in a high impedance state; and
   storing the sampled back electro-motive force as waveform data.

2. The method according to claim 1, wherein, in the sampling, one end of each of the all phase coils is set in a high impedance state.

3. The method according to claim 1, wherein, in the sampling, the back electro-motive force induced in the single phase coil is sampled on the premise that the back electro-motive force thus sampled is used for driving the all phase coils.

4. The method according to claim 1, wherein, in the sampling, the back electro-motive forces induced in each of the all phase coils are sampled.

5. The method according to claim 1, wherein the multiphase DC motor is driven by a 120 degrees excitation method, and wherein, in the sampling, the back electro-motive force is sampled over a predetermined electrical angle less than 240□, and wherein the waveform data sampled over the predetermined electrical angle is stored for generating a pulse modulated signal, the electrical angle of which ranges 0° to 240°.

6. The method according to claim 5, wherein, in the sampling, the predetermined electrical angle is set to 90° on the premise that: the pulse modulated signal, the electrical angle of which ranges 0° to 90°, is generated by using the sampled waveform data, the electrical angle of which ranges 0° to 90°; the pulse modulated signal, the electrical angle of which ranges 90° to 120°, is generated by inverting the sampled waveform data, the electrical angle of which ranges 60° to 90°, with respect to the time axis; the pulse modulated signal, the electrical angle of which ranges 120° to 150°, is generated by using the sampled waveform data, the electrical angle of which ranges 60° to 90°; and the pulse modulated signal, the electrical angle of which ranges 150° to 240°, is generated by inverting the sampled waveform data, the electrical angle of which ranges 0° to 90°, with respect to the time axis.

7. The method according to claim 5, wherein, in the sampling, the predetermined electrical angle is set to 120° on the premise that: the pulse modulated signal, the electrical angle of which ranges 0° to 120°, is generated by using the sampled waveform data, the electrical angle of which ranges 0° to 120°; and the pulse modulated signal, the electrical angle of which ranges 120° to 240°, is generated by inverting the sampled waveform data, the electrical angle of which ranges 0° to 120°, with respect to the time axis.

8. The method according to claim 1, wherein the multiphase DC motor is driven by the 120 degrees excitation method, and wherein, in the sampling, the back electro-motive force is sampled over an electrical angle of 240 °.

9. A motor drive circuit of a multiphase DC motor comprising:
   a plurality of switching circuits, each of which is provided for each coil of the multiphase DC motor so as to apply a high-level or low-level voltage to one end of a corresponding coil;
   a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level;
   a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater;
   a waveform data generating circuit that receives the pulse signal from the pulse signal generating circuit and that outputs predetermined waveform data in accordance with the pulse signal;
   a pulse modulated signal generating circuit that generates a pulse modulated signal by using the waveform data from the waveform data generating circuit;
   a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal; and
   a sampling circuit that, while running the multiphase DC motor at a predetermined rotational speed, samples over a predetermined period a back electro-motive force induced at one end of at least one phase coil, with one end of each phase coil of the multiphase DC motor being set in a high impedance state, wherein the waveform data generating circuit records as waveform data the back electro-motive force beforehand sampled by the sampling circuit.

10. The motor drive circuit according to claim 9, wherein the multiphase DC motor is a spindle motor in a hard disk apparatus.

11. The motor drive circuit according to claim 10, wherein the predetermined rotational speed is equal to the rotational speed of a disk in practical use of the hard disk apparatus.

12. A motor drive circuit of a multiphase DC motor comprising:
   a plurality of switching circuits, each of which is provided for each coil of the multiphase DC motor so as to apply a high-level or low-level voltage to one end of a corresponding coil;
   a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level;
   a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater;

a waveform data generating circuit that receives the pulse signal from the pulse signal generating circuit and that outputs predetermined waveform data in accordance with the pulse signal;

a pulse modulated signal generating circuit that generates a pulse modulated signal by using the waveform data from the waveform data generating circuit; and a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal, wherein the waveform data generating circuit includes a memory that records the waveform data obtained by sampling over a predetermined period a back electro-motive force induced at one end of at least one phase coil of the multiphase DC motor, while rotating the motor at a predetermined rotational speed and setting one end of each phase coil of the motor in a high impedance state.

13. A hard disk apparatus comprising:
a spindle motor that rotates a magnetic disk; and
the motor drive circuit according to claim 12, which drives the spindle motor.

14. A method for subjecting a multiphase DC motor to switch driving by using a pulse modulated signal, the method comprising:
rotating the multiphase DC motor at a predetermined rotational speed;
reading waveform data stored in a memory such that a pulse modulated signal, the pulse width of which varies in accordance with the waveform data, is generated accordingly;
subjecting the multiphase DC motor to the switch driving by using the pulse modulated signal;
measuring a physical quantity indicating a rotational state of the multiphase DC motor; and
updating the waveform data stored in the memory such that the measured physical quantity is brought close to a target value.

15. The method according to claim 14, wherein the measuring includes detecting an amount of vibration by using a shock sensor provided in the periphery of the motor, as the physical quantity indicating a rotational state of the multiphase DC motor, and wherein, in the updating, the waveform data is updated such that the amount of vibration is reduced.

16. The method according to claim 14, wherein the measuring includes detecting a sound volume by using an acoustic sensor provided in the periphery of the motor, as the physical quantity indicating the rotational state of the multiphase DC motor, and wherein, in the updating, the waveform data is updated such that the sound volume is reduced.

17. The method according to claim 14, wherein the measuring includes detecting power consumption of the multiphase DC motor as the physical quantity indicating the rotational state of the multiphase DC motor, and wherein, in the updating, the waveform data is updated such that the power consumption is reduced.

18. The method according to claim 14, wherein the measuring includes detecting temperature of the multiphase DC motor as the physical quantity indicating the rotational state of the multiphase DC motor, and wherein, in the updating, the waveform data is updated such that the temperature is reduced.

19. A drive circuit of a multiphase DC motor comprising:
a plurality of switching circuits, each of which is provided for each coil of the multiphase DC motor so as to apply a high-level or low-level voltage to one end of a corresponding coil;

a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level;

a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater;

a waveform data generating circuit that includes a waveform data memory for storing waveform data, and that outputs the waveform data in accordance with the pulse signal from the pulse signal generating circuits;

a pulse modulated signal generating circuit that generates a pulse modulated signal by using the waveform data from the waveform data generating circuit;

a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal;

a sensor by which a physical quantity indicating a rotational state of the multiphase DC motor is measured; and an encoder that updates the waveform data stored in the memory such that the physical quantity measured by the sensor is brought close to a target value.

20. The motor drive circuit according to claim 19, wherein the sensor is a shock sensor that is provided in the periphery of the multiphase DC motor so as to detect an amount of vibration, and wherein the encoder updates the waveform data such that the amount of vibration is reduced.

21. The motor drive circuit according to claim 19, wherein the sensor is an acoustic sensor that is provided in the periphery of the multiphase DC motor so as to detect a sound volume, and wherein the encoder updates the waveform data such that the sound volume is reduced.

22. The motor drive circuit according to claim 19, wherein the sensor is a power meter that detects power consumption of the poly DC motor, and wherein the encoder updates the waveform data such that the power consumption is reduced.

23. The motor drive circuit according to claim 19, wherein the sensor is a temperature sensor that detects a temperature of the multiphase DC motor, and wherein the encoder updates the waveform data such that the temperature is reduced.

24. A motor drive circuit of a multiphase DC motor comprising:
a plurality of switching circuits, each of which is provided for each coil of the multiphase DC motor so as to apply a high-level or low-level voltage to one end of a corresponding coil;

a back electro-motive force detecting circuit that compares a back electro-motive force induced in at least one coil of the multiphase DC motor with a midpoint voltage of the coils to detect a zero-cross point, and that outputs a back electro-motive force detecting signal at a predetermined level;

a pulse signal generating circuit that receives the back electro-motive force detecting signal and that generates a pulse signal in synchronization with the back electro-motive force detecting signal, the frequency of the pulse signal being obtained by multiplying the frequency of the back electro-motive force detecting signal by n, where n indicates an integer of 2 or greater;

a waveform data generating circuit that includes a waveform data memory for storing waveform data, and that outputs the waveform data in accordance with the pulse signal from the pulse signal generating circuits;

a pulse modulated signal generating circuit that generates a pulse modulated signal by using the waveform data from the waveform data generating circuit;

a switching control circuit that receives the back electro-motive force detecting signal from the back electro-motive force detecting circuit and the pulse modulated signal from the pulse modulated signal generating circuit and that controls a sequence of on/off states of the plurality of switching circuits based on the back electro-motive force detecting signal, and that subjects at least one of a high-side switch and a low-side switch included in each of the plurality of the switching circuits to switching control based on the pulse modulated signal; and an interface circuit that receives waveform data from an outside processor to write the data into the waveform data memory.

25. A hard disk apparatus comprising:
a spindle motor that rotates a magnetic disk; and
the motor drive circuit according to claim 19, which drives the spindle motor.

* * * * *